Nov. 25, 1924.                                         1,517,111
                    B. B. FOULKROD
              GRAVITY OPERATED HEADLIGHT
                 Filed Oct. 11, 1923
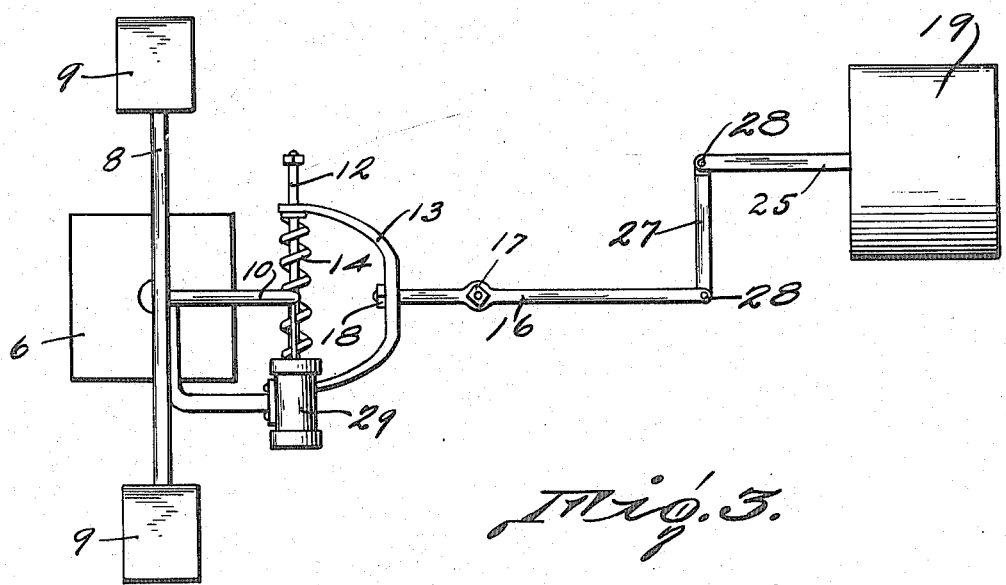
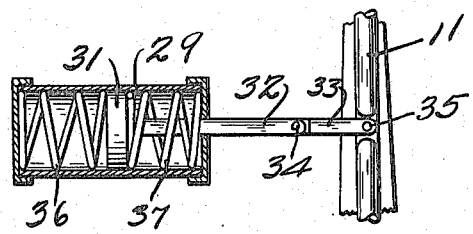
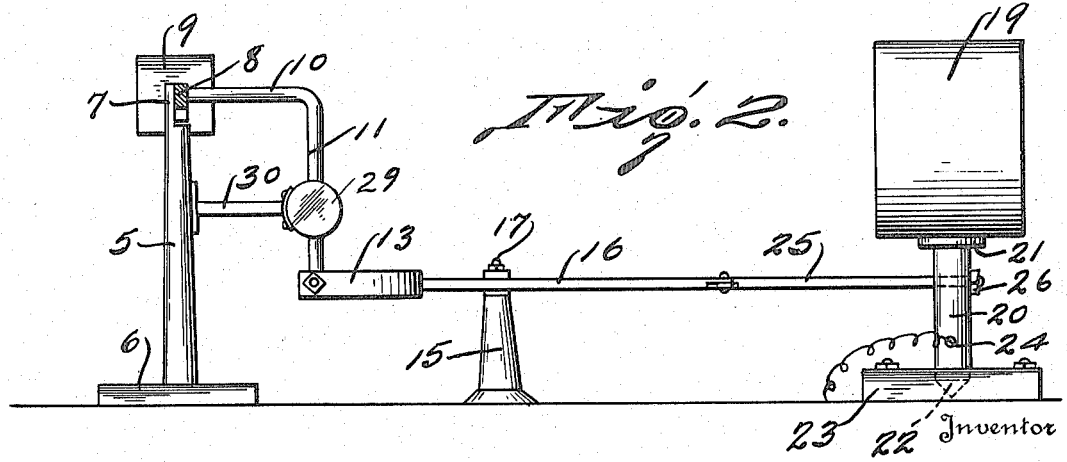
Inventor
By Byron B Foulkrod
                                        Attorney Patented Nov. 25, 1924.

1,517,111

UNITED STATES PATENT OFFICE.

BYRON B. FOULKROD, OF KANE, PENNSYLVANIA.

GRAVITY-OPERATED HEADLIGHT.

Application filed October 11, 1923. Serial No. 667,866.

*To all whom it may concern:*

Be it known that I, BYRON B. FOULKROD, a citizen of the United States, residing at Kane, in the county of McKean and State of Pennsylvania, have invented certain new and useful Improvements in Gravity-Operated Headlights, of which the following is a specification.

This invention relates to improvements in gravity operated headlights particularly adapted for use on railways, railroads, and the like.

An important object of this invention is to provide a headlight which will continually illuminate the track in front of a locomotive or the like regardless of whether the track is on a straight run or a curve.

A further object of the invention is the provision of a headlight which will turn in accordance with the curve assumed by the track without attention from the operator of the vehicle.

A further object of the invention is to provide a headlight of this character which is simple and durable in construction and efficient for the purpose intended.

Other objects and advantages of the invention will be apparent during the course of the following description.

In the accompanying drawing forming a part of this specification and in which like numerals are employed to designate like parts throughout the same:

Figure 1 is a plan view of the assembled device,

Figure 2 is a side elevation of same, and

Figure 3 is an enlarged view of one of the details.

In the drawing, wherein for the purpose of illustration is shown the preferred embodiment of my invention, the numeral 5 designates a standard which is supported by a base 6. The upper portion of the standard is cut away as at 7 to permit a crossbar 8 which carries a pair of weights 9 at its extremity to be pivoted thereto. A swinging rod 10 is rigidly secured to the crossarm 8 and bent downwardly as at 11 to engage the sliding rod 12. The sliding rod 12 is supported in openings in an arcuate bar 13 which is given side movement by the spring 14 which is coiled about the sliding rod 12. The arcuate bar 13 imparts movement to a series of levers which actuate the headlight supported by a swinging pivot 15. The lever 16 is provided with an opening therein for engaging the pivot stud 17 and extends through the arcuate bar 13, being secured thereto by the nut 18. The headlight 19 is mounted upon a revolving post 20 and secured thereto by a collar 21. The lower end of the post 20 tapers to a point as at 22 and fits into a recess, adapted to receive same, in the plate 23. The post 20 also has a central bore drilled therein and an opening 24, having connection with said central bore, for transmission of the electric wires or the like for operation of the light. An actuating lever 25 is threadedly connected to the post 20 and secured in position by a nut 26. A connecting lever 27 connects the swinging lever 16 and actuating lever 25 by means of bolts 28. In order that the weights 9 may be kept at equilibrium when the vehicle is running on a straight track, a cylinder 29 is secured to the standard 5 by means of a bracket 30. The cylinder 29 has a reciprocating piston 31 mounted therein and a pair of levers 32 and 33 joined together by a bolt 34 and connected to the downwardly bent portion 11 of the rod 10 as at 35. A pair of equalizing springs 36 and 37 are positioned on each side of the piston 31 and thereby tend to keep the weights 9 in a level position.

In operation, the device is positioned on a locomotive or other vehicle in such manner as to enable the light 19 to throw its rays upon the track directly in front of the vehicle and upon rounding a curve the vehicle sways inwardly due largely to the lowered position of the inner rail, and the weights 9 being kept on a true level by the force of gravitation will cause the rod 10 to exert a pressure on the spring 14 which in turn forces the arcuate bar 13 to swing inwardly and impart movement to the series of levers resulting in like movement of the headlight 19 which therefore throws the light upon the rails in front of the vehicle at all times and enables the operator to note the condition of the roadway to be traversed. As the device is comparatively simple and compact, it is thought to have advantage over similar devices now in use as it is practically impossible for same to get out of order or become broken.

It is to be understood that the form of my invention herewith shown and described is to be taken as the preferred example of the same, and that various changes in the shape, size, and arrangement of parts may be resorted to without departing from the spirit of my invention or the scope of the subjoined claims.

Having thus described my invention, I claim:

1. A device of the character described comprising a pair or weights, a crossarm carrying one weight on each end thereof, means for pivotally supporting the crossarm intermediate its ends, a plurality of levers, an L-shaped connecting rod movable with said crossarm for operating said levers, a headlight connected to the last of said levers, and means for normally retaining the weights in a level position.

2. A device of the character described comprising a pair of weights, a crossarm carrying the weights, an upright standard upon which the crossarm is pivoted, an arcuate bar, a cross rod movably mounted in openings in the arcuate bar, a connecting bar secured to the crossarm and in contact with the cross rod, a spring coiled about the cross rod, a swinging lever connected to the arcuate bar, a pivot standard supporting the swinging lever, a headlight, a revolving rod supporting the headlight, a base which supports the revolving rod, a plurality of levers connecting the headlight rod with the swinging lever, and means which will retain the weights in a level position.

3. A device of the character described comprising a pair of weights, a crossarm connecting the weights; an upright standard, a base for supporting the standard, means for connecting the crossbar to the standard; a crossarm rod secured to the crossarm; a semicircular bracket, a swinging lever secured to the bracket, a headlight actuating lever, a connecting lever pivotedly connecting the swinging lever and headlight lever; a cross rod movably mounted in openings of the bracket, said rod being joined with the crossarm rod, a spring coiled about said cross rod; a headlight, a revolving stanchion for supporting the headlight, a collar for securing the headlight to the stanchion, a base plate for holding the stanchion in an upright position; a cylinder secured to the upright standard, a piston positioned in the cylinder, a pair of pivoted levers connecting the piston with the crossarm rod, and a pair of springs positioned on either side of the piston for equalizing same.

In testimony whereof, I have affixed my signature in the presence of two witnesses.

BYRON B. FOULKROD.

Witnesses:
EUGENE EMONS,
W. O. AGENS.